Feb. 5, 1952      J. A. SKOOG      2,584,236
GRIP TONGS
Filed July 9, 1946
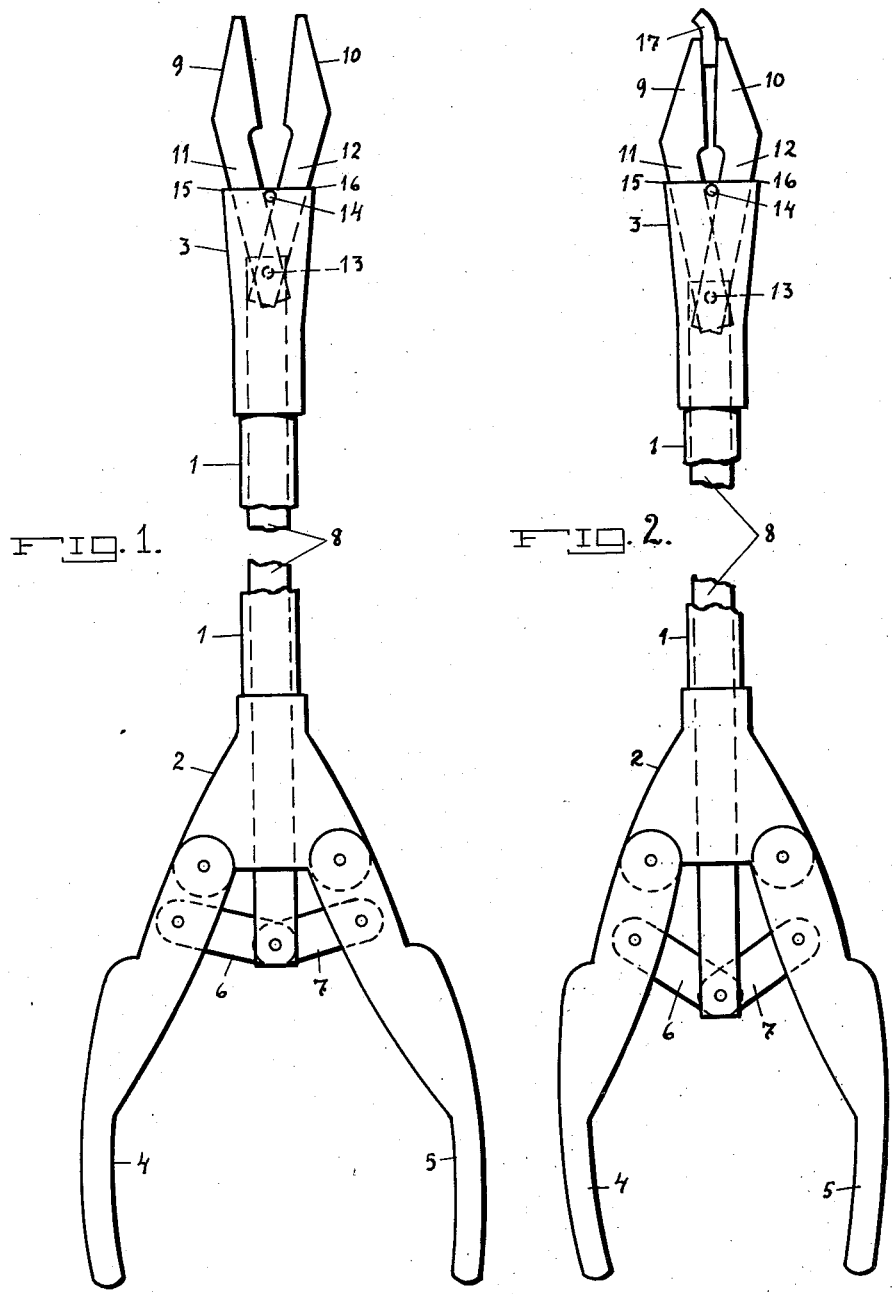
INVENTOR.
JOHN ARVID SKOOG
BY Harry Ernest Rubens
ATT'Y Patented Feb. 5, 1952

2,584,236

UNITED STATES PATENT OFFICE 2,584,236

GRIP TONGS

John Arvid Skoog, Grastorp, Sweden

Application July 9, 1946, Serial No. 682,192
In Sweden February 22, 1945

1 Claim. (Cl. 294—115)

This invention relates to certain novel improvements in grip tongs for objects difficult of access for instance on machines with details assembled tightly together as in the aeroplane industry or such like. The tongs of this kind are of an elongated type where the jaws are moved by means of handles at the rear end of a tube within which an intermediate slideable rod transmits the movement from the handles to the jaws situated at the forward end of the tube.

One object of my invention is to provide a pair of tongs which will need extremely small space laterally.

Another object of my invention is to provide tongs, the jaws of which are locked in gripping position.

Another object of my invention is to provide an arrangement of parts, which will make the tool easy and cheap in manufacture.

Other objects will appear hereinafter.

The invention consists in the novel combination and arrangements of parts to be hereinafter described and claimed.

The invention will be best understood by reference to the accompanying drawing, showing the preferred form of construction and in which:

Fig. 1 is a side view of the tool with the jaws open; and

Fig. 2 is a similar side view thereof with the jaws in gripping position.

The grip tongs have been given a great length by means of an intermediate tube 1 between the handles 4, 5 and the jaws 9, 10. The tube has a widened portion 2 at its rear end whereat the handles 4, 5 are swingably mounted, and the forward end 3 of the tube is also somewhat widened preferably to a conical shape. The handles are by means of links 6, 7 connected to the rear end of a rod 8 which is slideably guided within the tube and can be moved forwards and backwards by the movement of the handles.

At the forward end of the rod 8 two jaws 9, 10 are by means of elongated arms 11, 12 swingably mounted to a pin 13 in the rod end. This rod end together with the jaw arms lie within the tube end 3 when the jaws are shut. At the open free end of the tube there is a guide pin 14 secured to the tube and crossing the opening between the jaw arms and serving as guide for their inner sides, and the side edges 15, 16 of the tube end serve as guides for the back sides of said jaw arms.

When in use, the handles are moved from each other the rod 8 will be moved forwards together with the jaws, and at this movement the guide pin 14 will force the jaws to open, the side edges 15, 16 preventing them from opening more than the guide pin allows. This open position is shown in Fig. 1. When the jaws have to grip an object 17, as indicated in Fig. 2, the handles are moved towards each other pushing the jaw arms by means of the rod into the tube end 3, and the guide edges 15, 16 force the jaws towards each other to grip the object. The laterally directed pressure on the jaws from the object is transmitted to said guide edges, and such a friction arises between the jaw arms and the guide edges that the jaws cannot open by themselves, but have to be forcibly opened by pushing out the jaw arms through the tube end by means of the handles, these being forcibly moved from each other. Thus the object is securely held by the jaws and can be moved to and from the place where it is to be mounted or dismounted without any risk of falling down. If desired the jaws can be exchangeably arranged.

While I have illustrated and described the preferred form of construction, this is capable of modifications without departing from the spirit of the invention. I, therefore, do not wish to be limited to the precise details of construction set forth.

Having thus described my invention what I claim as new and desire to protect by Letters Patent is:

Grip tongs for objects difficult of access, comprising a tube having open ends, a rod slidably guided within the tube, a pair of jaw members having gripping surfaces pivotally mounted to the forward end of the rod and extending beyond said tube, a guide pin mounted to the forward end of the tube crossing the opening in the tube and extending between said jaw members to separate the jaws to an open position when the rod is moved forward, the edges of the open end of the tube serving as guides to engage the jaws and force them to a closed position when the rod is moved rearwardly, said jaw members positioned so that the gripping surfaces close in the vicinity of the tube opening, a pair of backwardly directed handles pivotally mounted to the rear end of the tube and movable to an open and closed position, a pair of link members pivotally mounted to the handles and directed backwards to and connected to the end of the rod whereby closing and opening the handles will move the rod rearwardly and forwardly to close and open the jaw members respectively, said handles longitudinally positioned facing each other and laterally spaced to be gripped by one hand of the operator.

JOHN ARVID SKOOG.

REFERENCES CITED

The following references are of record in the file of this patent:

UNITED STATES PATENTS

| Number | Name | Date |
|---|---|---|
| 719,707 | Williams | Feb. 3, 1903 |
| 1,212,303 | Wilt | Jan. 16, 1917 |
| 1,888,929 | McDowell | Nov. 22, 1932 |
| 2,060,366 | Dunlap | Nov. 10, 1936 |